United States Patent
Preusser et al.

(10) Patent No.: US 9,381,877 B2
(45) Date of Patent: Jul. 5, 2016

(54) METHOD FOR OPERATING A MOTOR VEHICLE IN A PRESENTATION MODE

(71) Applicant: FORD GLOBAL TECHNOLOGIES, LLC, Dearborn, MI (US)

(72) Inventors: Lukas Preusser, Cologne NRW (DE); Nils David Schloesser, Cologne NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/491,488

(22) Filed: Sep. 19, 2014

(65) Prior Publication Data
US 2015/0088377 A1   Mar. 26, 2015

(30) Foreign Application Priority Data
Sep. 20, 2013   (DE) .......................... 10 2013 218 920

(51) Int. Cl.
*B60R 16/023*   (2006.01)

(52) U.S. Cl.
CPC .................................... *B60R 16/023* (2013.01)

(58) Field of Classification Search
CPC ........ B60R 16/023; B60R 25/24; B60R 25/04
USPC ........... 701/36, 2, 24, 49; 340/5.6, 5.61, 5.52, 340/12.22, 5.8, 12, 426.36, 12.23
See application file for complete search history.

(56) References Cited

U.S. PATENT DOCUMENTS

| | | | | |
|---|---|---|---|---|
| 5,751,073 A | * | 5/1998 | Ross ....................... | B60R 25/24 123/179.2 |
| 2004/0071444 A1 | * | 4/2004 | Yoshio ................... | G09B 5/065 386/252 |
| 2004/0090124 A1 | * | 5/2004 | Geber .............. | B60R 25/02142 307/10.3 |
| 2006/0114101 A1 | * | 6/2006 | Schambeck ......... | B60R 25/2081 340/5.61 |
| 2007/0109094 A1 | * | 5/2007 | Sahai ...................... | B60R 25/04 340/5.72 |
| 2010/0141425 A1 | * | 6/2010 | Tracey ................. | B65H 75/403 340/539.1 |
| 2010/0295670 A1 | * | 11/2010 | Sato ....................... | B60Q 3/042 340/458 |
| 2012/0078443 A1 | * | 3/2012 | Matsubara .............. | B60R 25/00 701/2 |
| 2014/0256304 A1 | * | 9/2014 | Frye ...................... | H04W 4/206 455/418 |

* cited by examiner

*Primary Examiner* — Marthe Marc-Coleman
(74) *Attorney, Agent, or Firm* — Frank A. MacKenzie; Brooks Kushman P.C.

(57) ABSTRACT

A method for operating a motor vehicle having one or more electrical systems/devices, wherein the systems/devices are operable in at least two different modes. In a normal mode, a vehicle key is required for activation of at least one of the electrical devices. After enabling of a presentation mode, activation of the at least one device is possible without use of the vehicle key. The presentation mode is optimized for use in a dealership, where certain electrical/electronic functions of the vehicle should be available for use by a potential buyer without the requirements of a dealership employee being present with the vehicle key.

19 Claims, 2 Drawing Sheets

METHOD FOR OPERATING A MOTOR VEHICLE IN A PRESENTATION MODE

CROSS-REFERENCE TO RELATED APPLICATIONS

This application claims foreign priority benefits under 35 U.S.C. §119(a)-(d) to DE 10 2013 218 920.6 filed Sep. 20, 2013, which is hereby incorporated by reference in its entirety.

TECHNICAL FIELD

The invention relates to a method for operating a motor vehicle in a presentation mode wherein electrical devices may be activated without the need for a vehicle key.

BACKGROUND

Modern motor vehicles are increasingly equipped with electrical systems/devices and functions which are intended to be used for the safety and the comfort of the passengers and/or for their entertainment. The scope of the offered functions, and the operation and quality thereof, are often crucial to a customer's purchasing decision. Therefore, it is advantageous if said functions can be presented to a potential buyer in the salesroom of a car dealership and/or at a sales fair, so that said potential buyer can directly experience said functions.

However, in motor vehicles known to date, only a few electrical systems can be operated without a vehicle key, with the result that the vehicle keys which are required therefor are present at the car dealerships in order to be able to present functions of vehicles inside the salesrooms as necessary. "Vehicle key" is to be understood here as any suitable key which is suitable for enabling access to the vehicle and for starting up same. This also comprises electronic access controls. However, said keys are usually stored in a locked cupboard in order to avoid loss and misuse. Thus, for example, it is intended to be prevented that engines of vehicles which are located in a salesroom are started at unobserved moments. Therefore, it is not possible for customers who are viewing a vehicle there and, in this case, usually also climb into the vehicle to experience and test the various electrical systems/devices in operation. For this purpose, a vendor having possession of the correct vehicle key required in order to activate the functions must first be contacted. Usually, the further viewing of the vehicle then takes place in the presence of the vendor since they will not leave the customer alone with the vehicle key for the aforesaid reasons. Consequently, during this time, other customers cannot test any vehicles as long as no other vendors are available.

Therefore, it is an object of the invention to provide a method for operating a motor vehicle, which method enables a person, in particular a customer in a salesroom, to directly experience and test electrical systems/devices of the vehicle without a vehicle key. It is also an object of the invention to provide such a motor vehicle.

SUMMARY

The disclosed method is used to operate a motor vehicle which has at least one electrical or electronic system or device which is operable in at least two different operating modes. Such electronic systems/devices are, for example, navigation systems or audio systems, but also electrically powered systems/devices such as windshield wipers, horns and/or engines. In a first operating mode, activation of one or more selected electrical systems/devices is possible only after use of a vehicle key. Said first mode corresponds, for example, to the normal mode in which motor vehicles are usually delivered to the customer. In this normal operating mode, the electrical systems/devices cannot be operated without a vehicle key, which can result in the above-mentioned problems in the event of exhibition of an associated motor vehicle in a salesroom or at a sales fair.

The disclosed method therefore provides that a second mode can be enabled or selected, in which operation of the one or more selected systems/devices is possible without the need for prior use of a vehicle key. This second mode is thus a special mode for sales or presentation purposes, which preferably is only selected or enabled for exhibiting the vehicle (presentation mode). Preferably, the presentation mode is enabled by the car dealer who usually obtains the vehicle in a transport mode and subsequently enables the presentation mode instead of the normal mode. In such a presentation mode, the car dealer can exhibit the vehicle without a vehicle key being necessary for the activation of certain electrical systems/devices. Potential customers can therefore directly experience the functions of said systems/devices and test them to the greatest extent as desired, which is advantageous for initiating sales.

Since while in the presentation mode no key is necessary for operating an electrical system/device, it may be advantageous to provide or a triggering event (trigger) in order to activate or to start the operation of the at least one electrical system/device in the presentation mode. This trigger may be, for example, an event at the motor vehicle and, in particular, the opening of a vehicle door. In the presentation mode, as soon as the customer opens, for example, the driver's door, one or more electrical systems/devices are activated and can be used. Then, for example, the functions of a navigation system and/or audio system/device can be actuated and selected in order to test the handling of these systems/devices. This has the advantage that the customer does not have to undertake any special steps in order to test a vehicle. Rather, the opening of a vehicle door, which is typical in the case of viewing, automatically causes the activation of certain electrical systems/devices.

Since, in certain circumstances, settings on the electrical systems/devices are changed during use by a customer, it can be provided that said variable settings of the at least one electrical device are returned or reset to particular standard or default settings owing to an event at the motor vehicle. By way of example, the volume of an audio device can be returned/reset to a predefined value so that the next customer is not met with an uncomfortable speaker level when testing the vehicle. Furthermore, in this way it is ensured that each customer is presented with a consistent picture of the electrical systems/devices of a vehicle.

An event such as this can be the renewed opening and/or closing of a vehicle door. If the opening of a vehicle door is selected as trigger for the resetting to standard or default settings, it is assumed that the door has already been closed by a customer and now a new customer would like to view the vehicle. For this purpose, the variable settings are reset.

If, by contrast, the closing of a door is selected as trigger, it is assumed that a customer has viewed the vehicle with an open door and closes the door when he leaves the vehicle again. If the variable settings are then reset, the vehicle is ready for viewing by a new customer.

Other triggers can be seat occupancy by a person or lack of seat occupancy when a person gets up from the seat. This can be easily and reliably detected by seat-occupancy sensors.

Other triggers can also be the detection of a person in the passenger compartment or the detection of no persons present in the passenger compartment. Said detection is done by suitable monitoring sensors in the passenger compartment.

In this case, the trigger can be restricted to the driver's door or else other doors and the above-described triggers. In particular, the trigger can also be the opening of the tailgate in order subsequently to be able to test the automatic opening of the tailgate, for example.

Such an approach possibly has the result that a customer cannot open and/or shut a vehicle door during their viewing without changed settings being reset. Therefore, the trigger "vehicle door" can be combined with other parameters, such as the time interval between opening and closing a door, for example. In the case of relatively short time intervals, this is indicated as closing and opening a door during the viewing, for example, while long time intervals indicate that the customer has left the vehicle. Said time intervals can also be freely programmable, such that the car dealer can define, for example, how long a customer can view a vehicle before settings are automatically reset. Furthermore, it can also be provided that the trigger for the resetting of settings on electrical systems/devices of the vehicle is exclusively the expiration of a defined time interval.

In one embodiment of the disclosed method, the motor vehicle has a plurality of electrical systems/devices which require activation by means of a vehicle key in order to be operated in a first operating mode. In the second operating mode, only a subset of said electrical systems/devices is operable/activatable without use of a vehicle key. This has the advantage that not all electrical systems/devices which require activation by means of a vehicle key in the normal mode are now also unrestrictedly available in the presentation mode. This applies, for example, to functions such as starting the engine but also to actuating a horn and/or the windshield wipers since such systems/devices of the vehicle should usually still not be activatable inside a salesroom. Thus, in the presentation mode, preferably only a predetermined, restricted subset of electrical systems/devices is activated which otherwise in the normal mode would require activation by means of a vehicle key. Said subset can be permanently predefined or freely reprogrammable by the car dealer.

Furthermore, it can be provided that at least one electrical device executes a predefined functional program as soon as the activation has occurred. Thus, for example, a navigation system or audio system can display a predefined start menu, display a greeting message and/or perform particular functions without a customer having to start the device or otherwise actuate it for this purpose.

In order to save energy, in another embodiment of the invention it is further provided that the at least one electrical device is deactivated as soon as a predefined time interval without the electrical device being used after activation has elapsed.

In another aspect disclosed herein, a motor vehicle has at least one electrical device which is operable in at least two operating modes and which, in a first mode, requires use of a vehicle key in order to be activated/operated. The device is further operable in a second operating mode, in which no activation by a vehicle key is necessary for the activation/ operation of the at least one electrical device. The embodiments and advantages of the above-described method thus apply analogously to the associated motor vehicle.

In this case, the second operating mode can be enabled in different ways. It is usually possible for a car dealer to access, by means of a diagnostics device which is available to him, the on-board electronics of a vehicle supplied to him in the transport mode, and to enable the normal mode, for example, when he wants to operate or sell the vehicle. By means of said diagnostics device, the second operating mode in the form of the presentation mode can now also be enabled. The parameters of the presentation mode can also be programmable via said diagnostics device if said parameters are intended by the car dealer to be freely selectable up to a certain degree. By way of example, the car dealer can thus determine the trigger for the activation of one or more electrical systems/devices, certain time intervals, etc. Thus, the vehicle also preferably has means for configuring the second operating mode.

In another embodiment of the invention, the second operating mode is, in contrast, activatable by means of a special key. With said special key, the vehicle cannot be opened but, once the vehicle has been opened by a valid vehicle key, the special key can be used to enable the presentation mode. However, both or other possibilities for activating the second operating mode can be simultaneously present and thus be used according to choice.

Further advantages, features and expedient developments of the invention emerge from the dependent claims and the following illustration of preferred exemplary embodiments on the basis of the Figures.

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
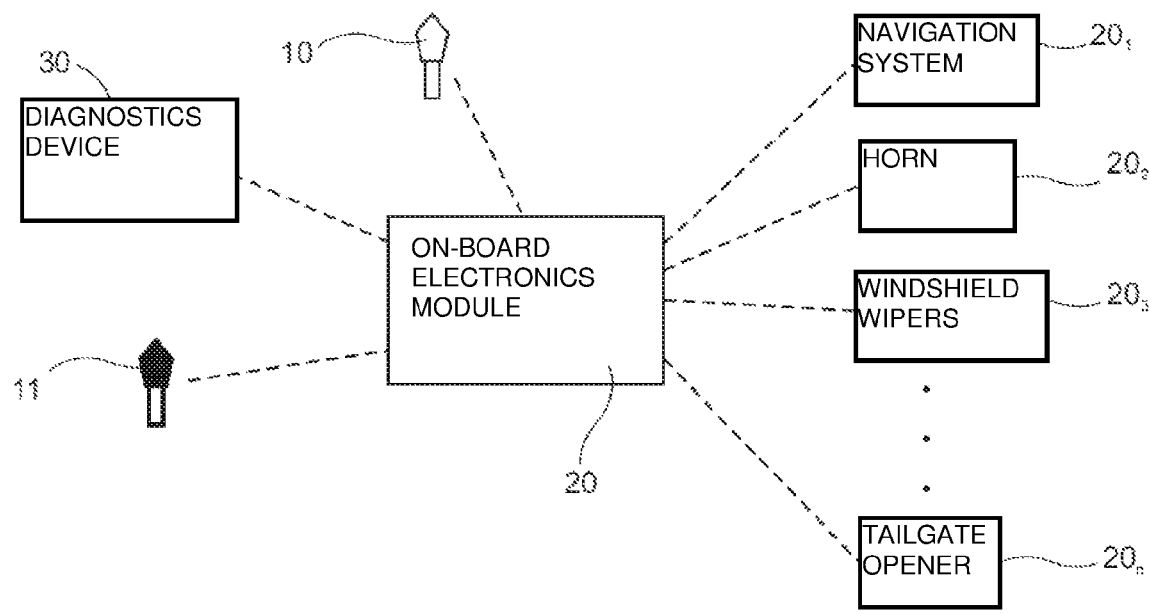
FIG. 1 shows a schematic illustration of the connection of a plurality of electrical systems/devices of a motor vehicle to on-board electronics.

FIG. 1 schematically illustrates the on-board electronics 20 of a motor vehicle, which on-board electronics actuate a plurality of electrical systems/devices $20_1, 20_2, 20_3, \ldots, 20_n$. This plurality includes one or more systems/devices which normally require that a vehicle key 10 used to unlock and/or start the vehicle be employed in order to operate the systems/ devices. However, it is not necessary for the vehicle key to be of the type which is physically inserted into a vehicle ignition switch or lock for the activation of the electrical systems/ devices. The term "vehicle key" here also refers to a non-contact key device used with a so-called keyless or push-button start system, in which the key can remain in the pocket of a driver, for example, and use wireless communication (such as a radio frequency transmission) to activate systems/ devices.

The terms "active" or "activated", when used herein in relation to a vehicle electrical device or system, describes a state in which the system/device may be either operating ("switched on") or operational in the sense that it may require an additional step or steps, such as actuation of a switch or other control device by a user and/or occurrence of a trigger event (as described below) to fully power-up or switch on the system device.

The on-board electronics 20 are formed, for example, by a bus system. By way of example, for the illustration of the invention, a navigation system/device $20_1$, a horn $20_2$, a windshield wiper system $20_3$ and a powered tailgate $20_n$, are cited as electrical systems/devices which can be powered and/or actuated via a bus system. A powered tailgate such as this is very practical for opening the trunk when a user does not have a hand free at that moment. For example, if a user briefly swings a foot under the rear bumper, the tailgate opens automatically. In this case, the system can be based on sensors under the bumper which react when an electrical field is interrupted by the foot passing below the bumper.

A signal which is sent to the vehicle then gives the command to open or close the tailgate. Such a system usually only functions if a user is carrying, for example, a keyless entry device on their person. However, this is also a feature of the vehicle which customers like to test when they view a vehicle. Therefore, it is well suited to be an electrical device that is operable in the presentation mode according to the invention.

A transport mode, in which the vehicle is delivered to a car dealer, is usually predefined by the on-board electronics 20 when a motor vehicle is delivered, for example, to the dealer. In this mode, as many electrical systems/devices as possible are usually blocked or suppressed in order to avoid the battery being discharged during transport. In addition to said transport mode, usually a production mode and an accident mode can also be set, which accident mode is enabled after a serious accident. Each mode is like a profile which is intended to optimize the behavior and the properties of the vehicle in the different conditions. The dealer then has a diagnostics device 30 which can be temporarily connected to the on-board electronics 20. In this way, the dealer can enable the normal mode on the vehicle, in which normal mode said vehicle can be fully operated and thus can also be exhibited and sold. Said normal mode is, for example, a possible first operating mode in the sense of the invention, in which first operating mode a vehicle key 10 is necessary for the activation and subsequent operation of individual electrical systems/devices. Said vehicle key 10 is illustrated in white in FIG. 1, while the special key 11 is illustrated in black.

Instead of the normal mode, according to the invention, the dealer (or other authorized person) can enable a presentation mode in which a particular and predetermined subset of electrical systems/devices is may be activated without the use of the vehicle key 10. Enabling of the presentation mode can be performed via a temporary connection of the diagnostics device 30. Alternatively or in addition, it is also possible for the presentation mode to be enabled via the special key 11. As has already been mentioned above, the special key 11 is distinguishable from a vehicle key 10 (as these terms are defined herein) in that a special key cannot be used to unlock, open, or start the motor of the vehicle but, once the vehicle has been opened by a valid vehicle key, the special key can be used to enable the presentation mode. As described above in relation to the vehicle key 10, the special key 11 may be of a type that is physically inserted into a vehicle lock, or it may be a device of the type used in a "key-less" electronic access system.

The configuration of the presentation mode can also be programmed via a memory function within a vehicle key. As soon as the vehicle is opened with a vehicle key programmed in this way, the presentation mode is enabled with the desired properties and activated electrical systems/devices.

Preferably, enabling of the presentation mode should in this case only be possible if the vehicle is in a suitable and, in particular, safe state. By way of example, inadvertent enabling of the presentation mode should not be possible while the vehicle is being driven. Rather, the vehicle can only be transferred into the presentation mode, for example, if a valid vehicle key could previously be detected, the vehicle speed is zero, etc.

After enabling of the presentation mode in the on-board electronics 20 of the vehicle in question, one or more of the electrical systems/devices connected to the on-board electronics 20 may be activated and no vehicle key is necessary for their operation. By way of example, this involves systems/devices such as the navigation system $20_1$ and the tailgate $20_n$, since customers may desire to test the functions of these systems/devices when viewing a vehicle and said functions should also be made available to the customer.

In contrast, electrical systems/devices such as a horn $20_2$ and/or a windshield wiper system $20_3$ should usually not be used inside a salesroom since these can otherwise lead to undesired noise nuisance and/or water in the salesroom. Such electrical systems/devices are therefore preferably not activated when in the presentation mode.

It should usually also not be possible to start the vehicle's engine in the presentation mode. However, customers could be interested in the function of some active safety elements which otherwise only work when the engine is running and/or when the vehicle is moving. Therefore, provision can be made for this purpose that a simulation/demonstration mode is selectable in the presentation mode, in which simulation/demonstration mode the effects of said active safety elements can be shown. This relates, for example, to warning messages which are output in hazardous situations.

However, the system should preferably protect the vehicle from excessive use or even damage, which can be achieved by means of periodic switching-off and associated messages. Said switching-off can occur automatically, for example, when unusual actuation of switches and operating elements in the vehicle is detected.

Figure 2:
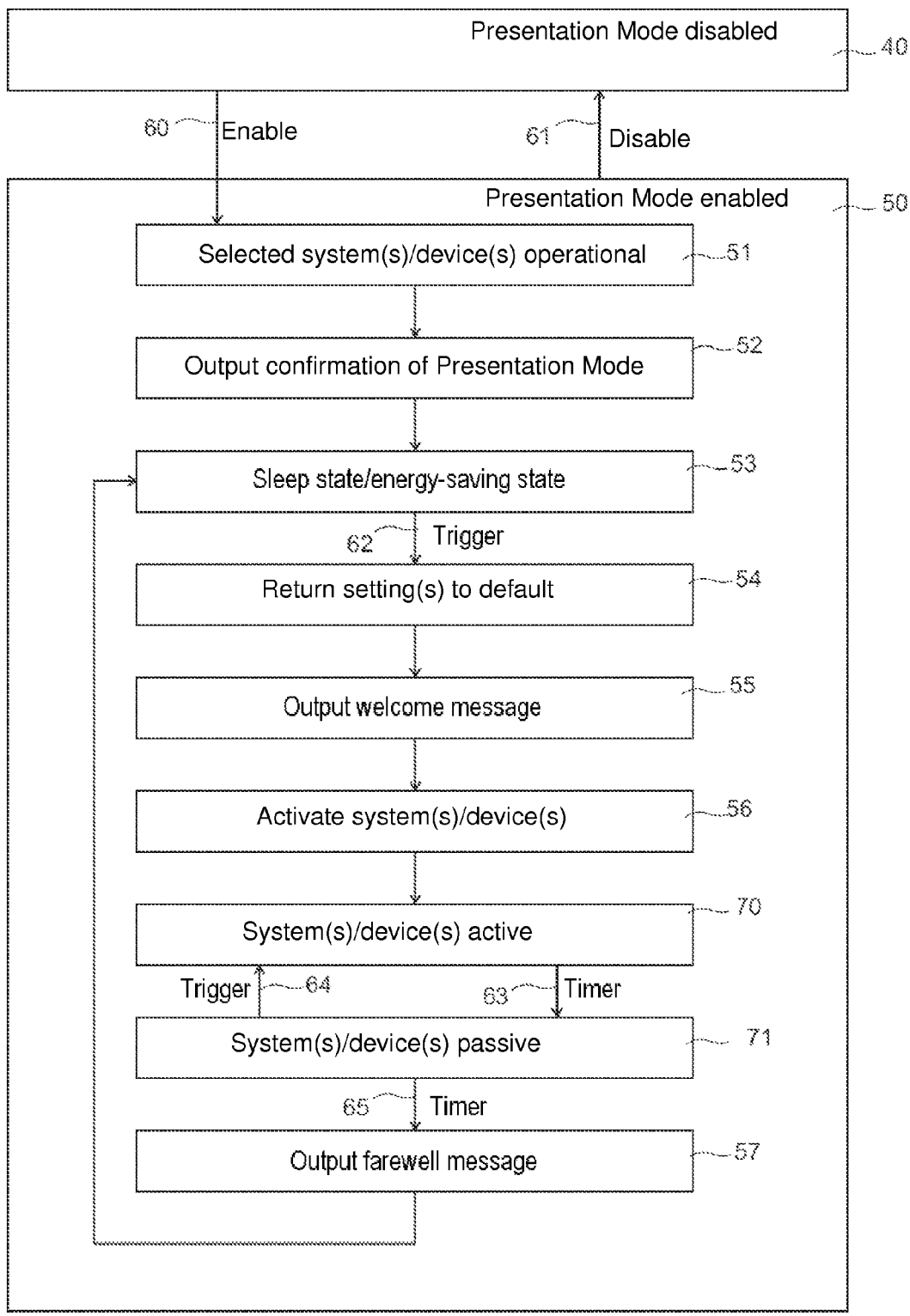
FIG. 2 shows functional sequences in the enabled presentation mode and between an enabled and disabled presentation mode.

FIG. 2 schematically shows the processes in the case of a disabled and an enabled presentation mode, wherein these two states are represented by two rectangles. The upper rectangle 40 represents the presentation mode is disabled, while the lower rectangle 50 represents the presentation mode is enabled and the processes thereof executed therein. The original state is "disabled" and a transfer to "enabled" occurs when the presentation mode is set, for example in the step 60, in the manner described above and the state of charge of the battery is high enough. Preferably, the state of charge of the battery is thus checked and the presentation mode can only be enabled if said state of charge is high enough.

In the enabled presentation mode, initially, in the step 51, certain selected electrical systems/devices are made operational and other systems/devices are suppressed (not made operational). By way of example, functions such as windshield wipers, windshield washer systems, horn, engine start, dipped beam headlight, etc. is suppressed. The selection of the functions to be made operational versus suppressed can be preconfigured or can be configured to be freely selectable by the dealer. Furthermore, it may be provided that, in the presentation mode, indicators such as the indication of the oil level, low washer water levels, etc. are suppressed.

Moreover, the system may generate or output, in the step 52 for example, a visual and/or audible confirmation for the user and/or the dealer that the presentation mode has been successfully enabled. In this connection, this can be, for example, the flashing of a light and/or a notification on a display of the diagnostics device 30. Alternatively or in addition, the successful enabling of the presentation mode can be indicated onboard the vehicle itself, which can take place, for example, via the display of a navigation and/or audio system/device.

When the presentation mode is initially enabled, the systems/devices made operational may initially enter a sleep state/energy-saving state 53 wherein they are not yet fully activated but rather are waiting for activation by a trigger 62. In said sleep state, the system should use as little energy as possible. However, it can also be provided that the daytime running light and/or the dipped beam headlight on the vehicle are permanently activated in order to draw attention to the vehicle in a salesroom. However, in order to spare the battery of the vehicle, this preferably is done via a connection to an external battery or power supply.

Energy management is therefore an important function within the presentation mode, and, after a timeout, the system preferably automatically returns to the energy-saving sleep state 53. This can also be done on the basis of the present state of charge of the battery and/or the presence of an external charging device. Furthermore, functions such as heated mirrors and windshields are preferably not made operational in the presentation mode since they are not noticeable to the customer anyway. In contrast, it may be desirable for the air-conditioning system and/or heated seats to be operational, since the functions thereof can be experienced and can positively influence the purchasing decision.

If the selected trigger to fully activate the operational systems/devices is the opening of a vehicle door, said trigger 62 may also effect, for example, a return or resetting of variable settings to standard or default settings on certain systems/devices (step 54), for example the navigation system $20_1$ and/or an audio device. In contrast, other systems such as an automatic/hands/free tailgate may have no settings which must be reset. Possible method sequences within the presentation mode are therefore described by way of example in the following text with reference to a navigation system.

Furthermore, it can be provided that at least one electrical device executes a predefined functional program as soon as the activation has occurred. Thus, for example, a navigation system or audio system can display a predefined start menu, display a greeting message and/or perform particular functions without a customer having to make a control input to start the device or otherwise actuate it for this purpose.

After parameters of the navigation system have been reset to default settings (step 54), it can be provided that, in the step 55, a welcome greeting can be displayed to the customer on a display of the navigation system. Thus, said customer can also be informed that the device can be used and tested by customers in said special presentation mode. Furthermore, a car dealer can personalize said welcome greeting and configure it as desired.

The welcome greeting can relate merely to the handling of the navigation device; however, it can also be provided that a general welcome message is output to the customer on the display of the navigation device display as soon as the customer opens the vehicle door. In said welcome message, for example, the now available functions can also be explained to the customer. Furthermore, particular lighting situations can be set, as are known from the normal mode when unlocking and locking the vehicle, for example.

Furthermore, in the step 56, electrical systems/devices such as the navigation system are then ultimately activated so that they can be switched on and used by the customer. Said systems/devices are then active in state 70. However, if use is not made of a device that has been activated, it is possible to change from the active state into an inactive and thus passive state 71 of the unused device by means of a timer 63. In said passive state 71, an interaction with a user is expected as trigger 64, which trigger serves to transfer all of the systems/devices or just the respective systems/device back into the active state 70. Such an interaction with the user preferably resets the timer so that the device(s) will return to the passive state 71 if not used before the timer expires again.

In the passive state 71, a timer 65 is likewise started, which timer shifts the system into the energy-saving sleep state 53 again without any interaction once a defined time interval has elapsed. Prior to this, another farewell message 57 can be displayed to the customer. If a user action takes place again, the timer is reset and the active state 70 is reached again.

If a vehicle which was previously exhibited in the presentation mode is purchased by a customer, it can be transferred into the normal mode again, for example by means of a diagnostics device via step 61, such that the presentation mode 40 is inactive again as in FIG. 2.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a motor vehicle comprising:
   operating in a first mode wherein a vehicle key is required for activation of an electrical device of the vehicle; and
   enabling a second mode wherein activation of the device is possible without use of the vehicle key, the second mode enabled using a diagnostic device which is temporarily connected to on-board electronics of the vehicle.

2. The method of claim 1 wherein, after enabling of the second mode, activation of the device is triggered by at least one of opening a vehicle door, detection that a vehicle seat is occupied, and detection that a vehicle passenger compartment is occupied.

3. The method of claim 1 wherein, after enabling of the second mode, a variable setting of the electrical device is reset to a standard/default setting.

4. The method of claim 3 wherein the reset of the variable setting is triggered by at least one of opening of a vehicle door, closing of a vehicle door, detection that a vehicle seat is unoccupied, and detection a vehicle passenger compartment is unoccupied.

5. The method of claim 1 wherein the electrical device executes a predefined functional program upon activation.

6. The method of claim 5 wherein the predefined functional program comprises displaying a welcome message.

7. The method of claim 1 wherein the electrical device, after being activated in the second mode, is deactivated if the device is not used within a predefined time interval.

8. A method for operating a motor vehicle comprising:
   operating in a first mode wherein a vehicle key is required for activation of an electrical device of the vehicle;
   using a diagnostic device which is temporarily connected to on-board electronics of the vehicle to enable a second mode wherein the device is operational in a sleep-state and may be activated without use of the vehicle key; and
   triggering activation of the device by at least one of opening a vehicle door, detection that a vehicle seat is occupied, and detection that a vehicle passenger compartment is occupied.

9. The method of claim 8 wherein, after enabling of the second mode, a variable setting of the electrical device is reset to a standard/default setting.

10. The method of claim 9 wherein the reset of the variable setting is triggered by at least one of opening of a vehicle door, closing of a vehicle door, detection that a vehicle seat is unoccupied, and detection a vehicle passenger compartment is unoccupied.

11. The method of claim 8 wherein the electrical device executes a predefined functional program upon activation.

12. The method of claim 11 wherein the predefined functional program comprises displaying a welcome message.

13. A motor vehicle having an electrical device alternatively operable in at least two modes, the modes comprising:
   a first mode wherein activation of an electrical device of the vehicle requires prior activation by a vehicle key; and
   a second mode wherein operation of the device is possible without prior activation by the vehicle key, the second mode enabled using a diagnostic device which is temporarily connected to on-board electronics of the vehicle.

14. The motor vehicle of claim 13 wherein, when operating in the second mode, activation of the device is triggered by at least one of opening a vehicle door, detection that a vehicle seat is occupied, and detection that a vehicle passenger compartment is occupied.

15. The motor vehicle of claim 13 wherein, when operating in the second mode, a variable setting of the electrical device is reset to a standard/default setting.

16. The motor vehicle of claim 15 wherein the reset of the variable setting is triggered by at least one of opening of a vehicle door, closing of a vehicle door, detection that a vehicle seat is unoccupied, and detection a vehicle passenger compartment is unoccupied.

17. The motor vehicle of claim 13 wherein the electrical device executes a predefined functional program upon activation.

18. The motor vehicle of claim 17 wherein the predefined functional program comprises displaying a welcome message.

19. The motor vehicle of claim 13 wherein the electrical device, after being activated in the second mode, is deactivated if the device is not used within a predefined time interval.

\* \* \* \* \*